United States Patent [19]
Kuo

[11] Patent Number: 5,426,962
[45] Date of Patent: * Jun. 27, 1995

[54] AUTOMOBILE LOCK

[76] Inventor: Stanley Kuo, P.O. Box 82-144, Taipei, Taiwan

[*] Notice: The portion of the term of this patent subsequent to Mar. 15, 2011 has been disclaimed.

[21] Appl. No.: 140,432
[22] Filed: Oct. 25, 1993

Related U.S. Application Data

[63] Continuation-in-part of Ser. No. 991,385, Dec. 16, 1992, Pat. No. 5,293,762.

[51] Int. Cl.6 .............................................. B60R 25/02
[52] U.S. Cl. ...................................... 70/238; 70/199; 70/211
[58] Field of Search ................. 70/237, 238, 225, 226, 70/199–212, 57, 58, 14, 18

[56] References Cited

U.S. PATENT DOCUMENTS

| | | | |
|---|---|---|---|
| 1,423,955 | 7/1922 | Miller | 70/203 |
| 4,825,671 | 5/1989 | Wu | 70/238 |
| 4,974,433 | 12/1990 | Wang | 70/238 X |
| 5,097,685 | 3/1992 | Lien | 70/238 X |
| 5,121,617 | 6/1992 | Chen | 70/238 X |
| 5,292,406 | 3/1994 | Lin | 70/238 X |
| 5,293,762 | 3/1994 | Kuo | 70/238 |

Primary Examiner—Peter M. Cuomo
Assistant Examiner—Suzanne L. Dino
Attorney, Agent, or Firm—Alfred Lei

[57] ABSTRACT

An automobile lock comprising a lock body including a locking portion and a swivel portion rotatably connected with the locking portion, a first spring-loaded pin disposed within the locking portion of the lock body and controlled by a lock core, a second spring-loaded pin extending through the locking portion and the swivel portion and having a head protruding out of an inner hole of the locking portion, a telescopic rod provided with threads, connected with a universal joint at one end, and connected with a ball member at the other end, the universal joint being connected with an insert plate, and a gear shift hook including an adjusting portion provided with an adjusting portion and an arm portion, whereby the gear shift lever and the phonographic equipment of an automobile can be locked up at the same time.

1 Claim, 6 Drawing Sheets

AUTOMOBILE LOCK

CROSS-REFERENCE

This invention is a continuation-in-part application of the former U.S. patent application No. 07/991,385, filed Dec. 16, 1992, now U.S. Pat. No. 5,293,762.

BACKGROUND OF THE INVENTION

It has been found that there are many kinds of automobile locks in use and on the market, which have almost the same principle that the lock is hooked on the steering wheel, extending out of it for preventing the steering wheel from rotating. However, such automobile locks cannot be used to prevent the phonographic equipment from being stolen.

Therefore, it is an object of the present invention to provide an automobile lock which can lock up the gear shift lever and the phonographic equipment.

SUMMARY OF THE INVENTION

This invention relates to an improved automobile lock.

It is the primary object of the present invention to provide an automobile lock which can lock up the gear shift lever and the phonographic equipment of an automobile at the same time.

It is another object of the present invention to provide an automobile lock which is fit for practical use.

It is still another object of the present invention to provide an automobile lock which is easy to operate.

It is still another object of the present invention to provide an automobile lock which is simple in construction.

It is a further object of the present invention to provide an automobile lock which is economic to produce.

Other objects and merits and a fuller understanding of the present invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

Figure 1:
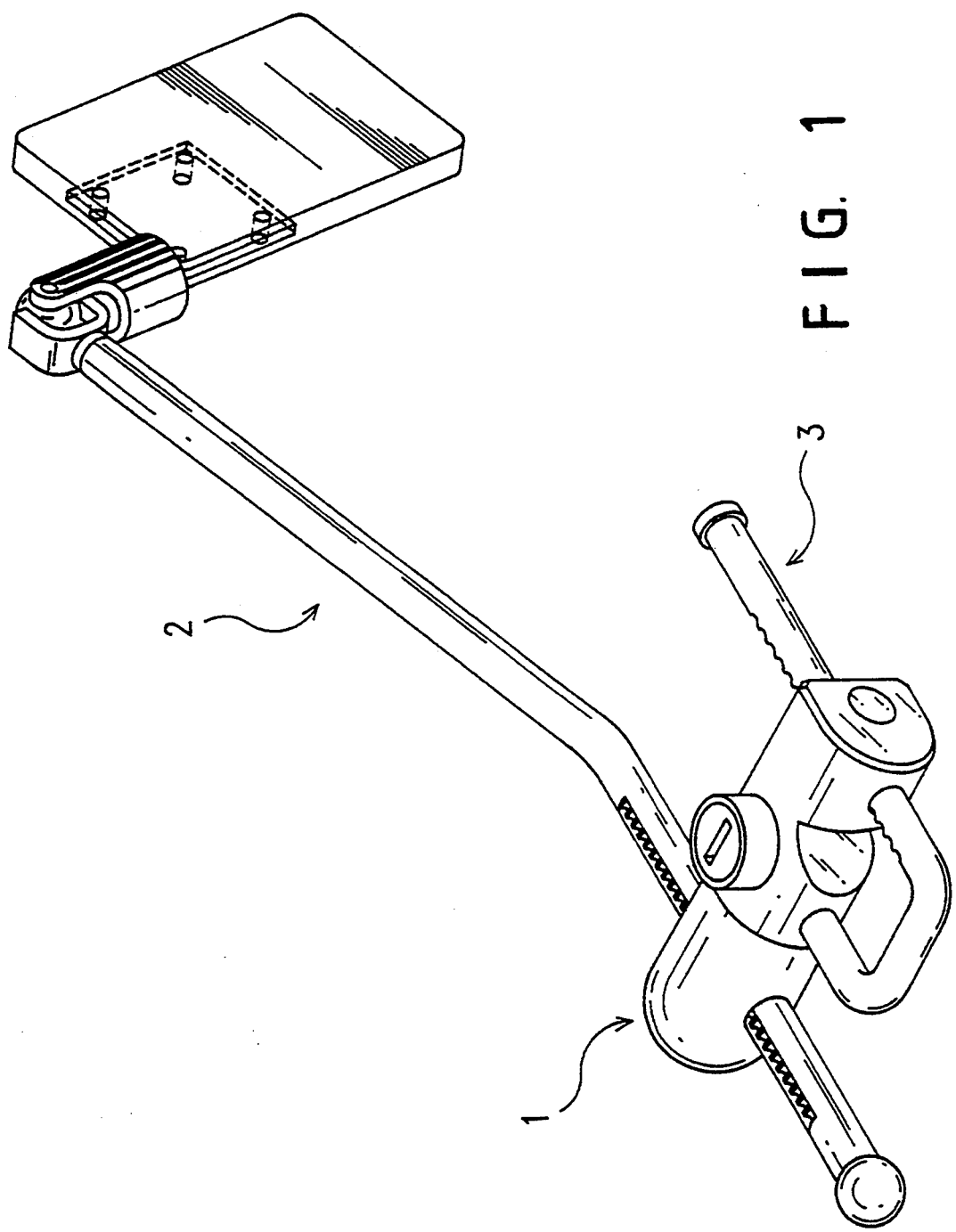
FIG. 1 is a perspective view of an automobile lock according to the present invention.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
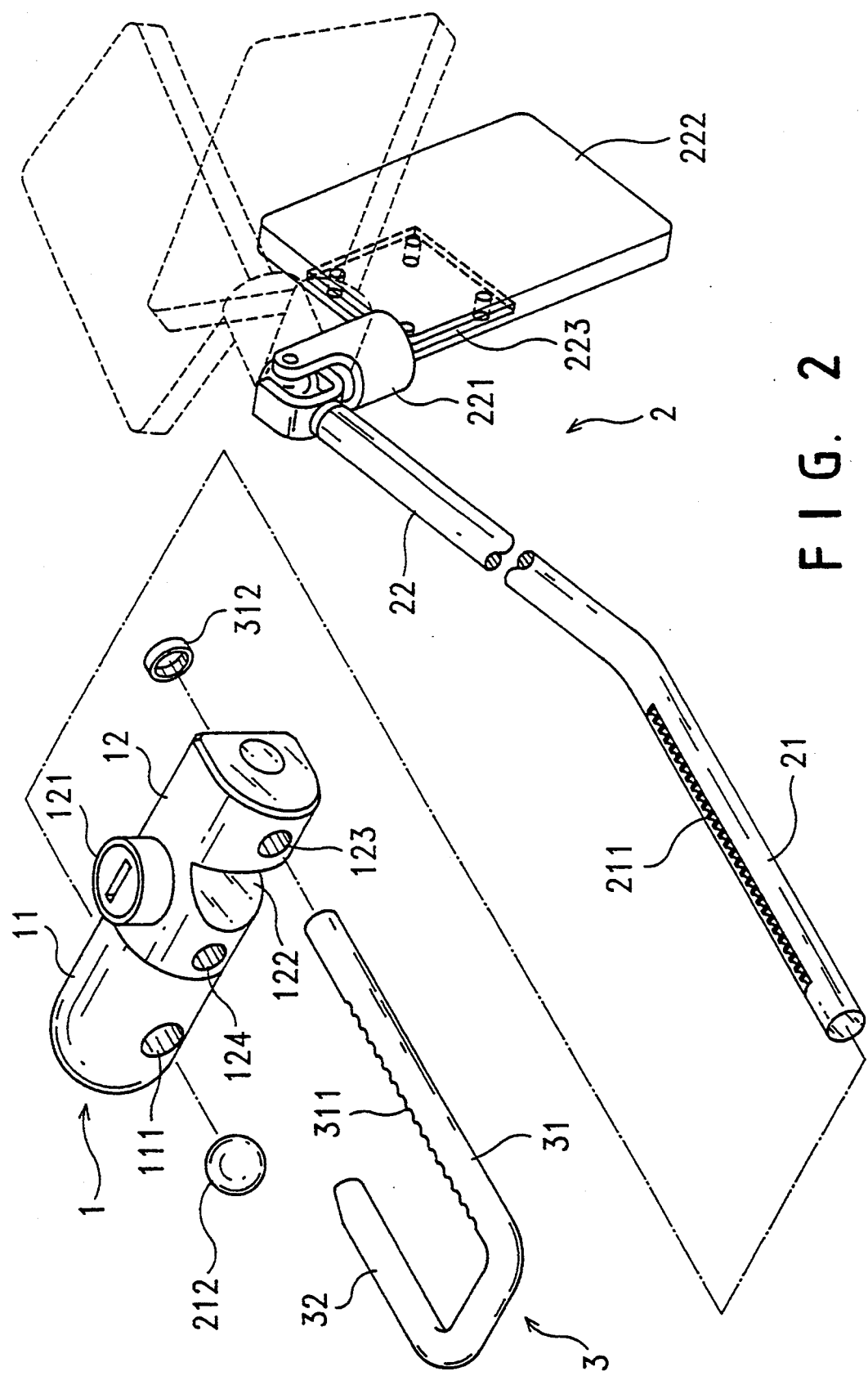
FIG. 2 is an exploded view of the automobile lock.

With reference to the drawings and in particular to FIGS. 1 and 2 thereof, the automobile lock according to the present invention mainly comprises a lock body 1, a telescopic rod 2 and a gear shift hook 3. As illustrated, the lock body 1 includes a swivel block 11 and a locking portion 12. The swivel block 11 is formed with a hole 111. The locking portion 12 is provided with a lock core 121 on the top, an outer hole 123, an inner hole 124, and a notch 122 between the outer hole 123 and the inner hole 124. The telescopic rod 2 includes a horizontal portion 21 and an inclined portion 22 and has a diameter slightly less than that of the hole 111 of the lock body 1. The horizontal portion 21 of the telescopic rod 2 is provided with a plurality of threads 211 while the inclined portion 22 is connected with a universal joint 221. The universal joint 221 is in turn connected with an insert plate 222. The insert plate 222 has the same size as a cassette tape which is preferably made of plastic and has a sheet steel 223 connected with the universal joint 221. The horizontal portion 21 of the locking portion 12 is inserted into the hole 111 of the lock body 1 and the outer end of the horizontal portion 21 is connected with a ball member 212 which has a larger diameter than the hole 111 so that the telescopic rod 2 is connected with the swivel block 11 of the lock body 1. The gear shift hook 3 includes an adjusting portion 31 provided with threads 311 and an arm portion 32. The inner hole 124 and the outer hole 123 have a larger diameter than the arm portion 32 and the adjusting portion 31 of the gear shift hook 3 so that the arm portion 32 and the adjusting portion 31 of the gear shift hook 3 can be inserted into the inner hole 124 and the outer hole 123 respectively. The adjusting portion of the gear shift hook 3 is inserted into the outer hole 123 of the lock body 1 and connected with a cap 312 at its end so as to prevent the gear shift hook 3 from detaching from the lock body 1.

Figure 3:
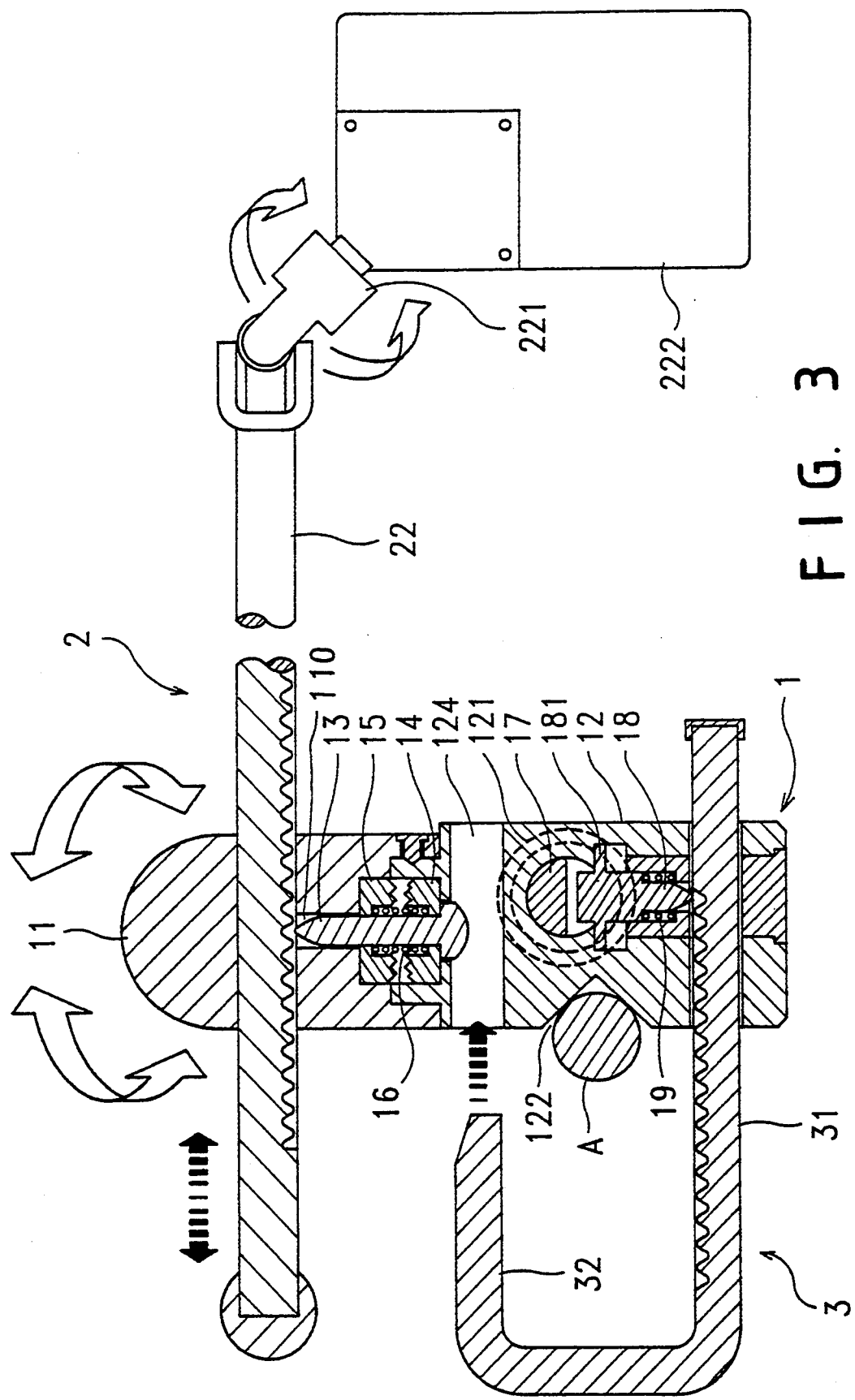
FIG. 3 is a sectional view of the automobile lock.
Figure 5B:
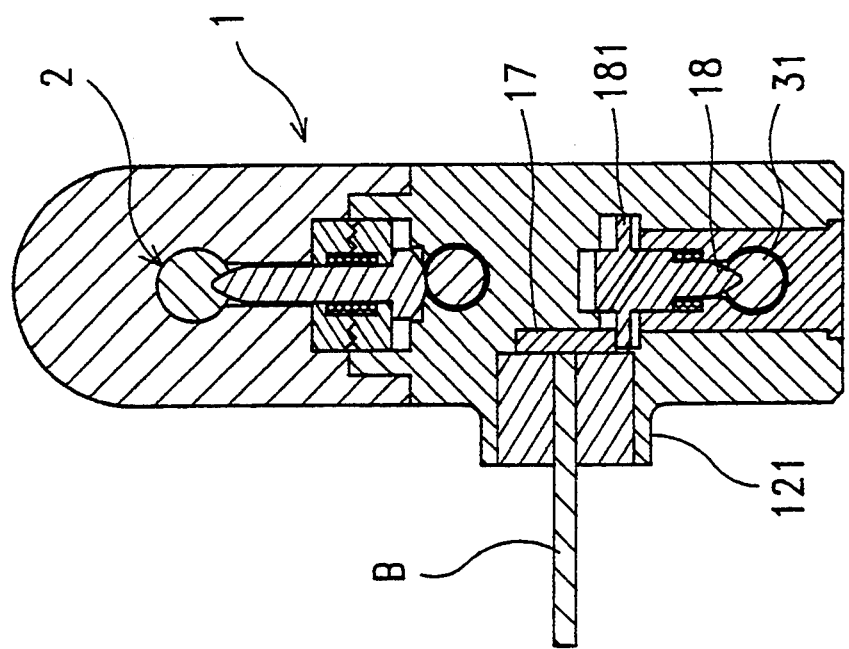
FIG. 5B still shows the working principle of the present invention.
Figure 5A:
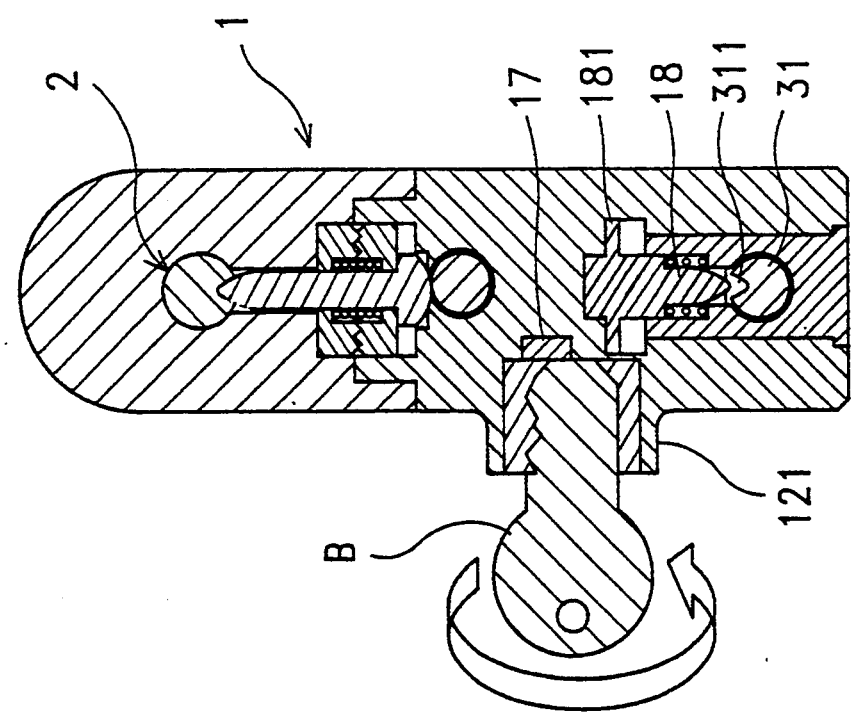
FIG. 5A still shows the working principle of the present invention.

As shown in FIG. 3, the swivel block 11 is rotatably mounted on the locking portion 12 by known means. Between the swivel block 11 and the locking portion 12 are fitted a driving gear 14 and a driven gear 15 engageable with the driving gear 14. A spring 16 is disposed between the driving gear 14 and the driven gear 15 so that the driving gear 14 tends to move away from the driven gear 15. A pin 13 extends through the locking portion 12, the driving gear 14 the spring 16, the driven gear 15, and a hole 110 of the swivel block 11. The hole 110 is communicated with the hole 111. The pin 13 is formed with a head protruding into the inner hole 124 of the locking portion 12. Within the locking portion there is a semi-circular member 17 which is connected with the bottom of the lock core 121 (see FIG. 5A). Under the semi-circular member 17 there is an engaging pin 18 having a flange 181. A spring 9 is sleeved over the tip of the engaging pin 18 so that the engaging pin 18 is moved upward by the spring 19.

Figure 4A:
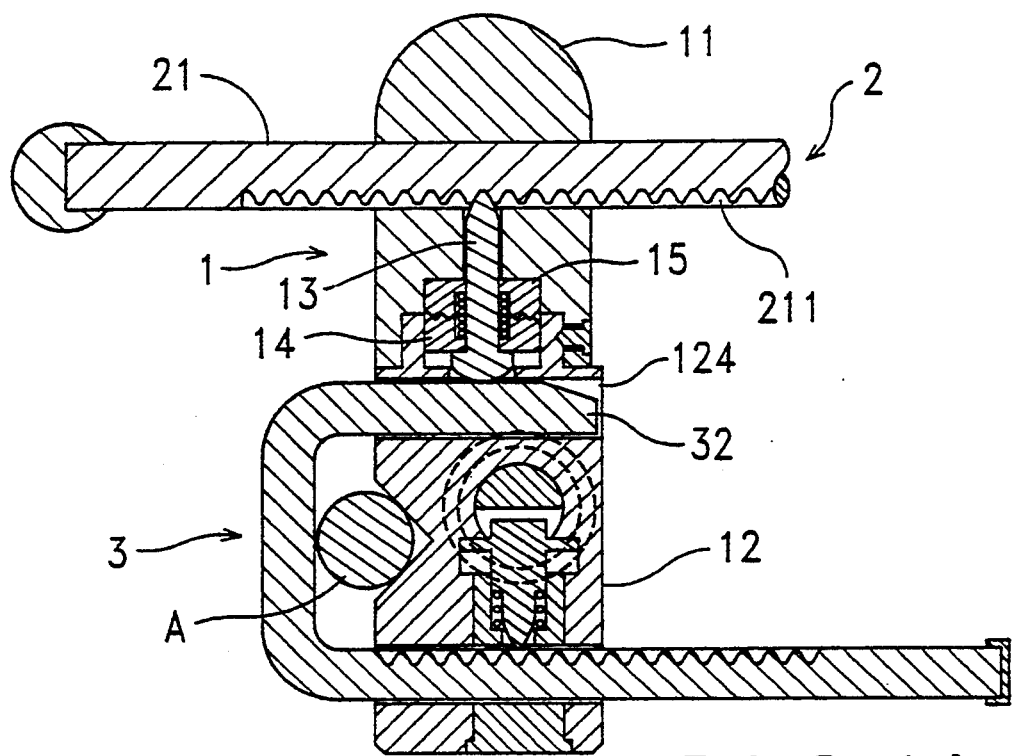
FIG. 4A shows the working principle of the present invention.
Figure 4B:
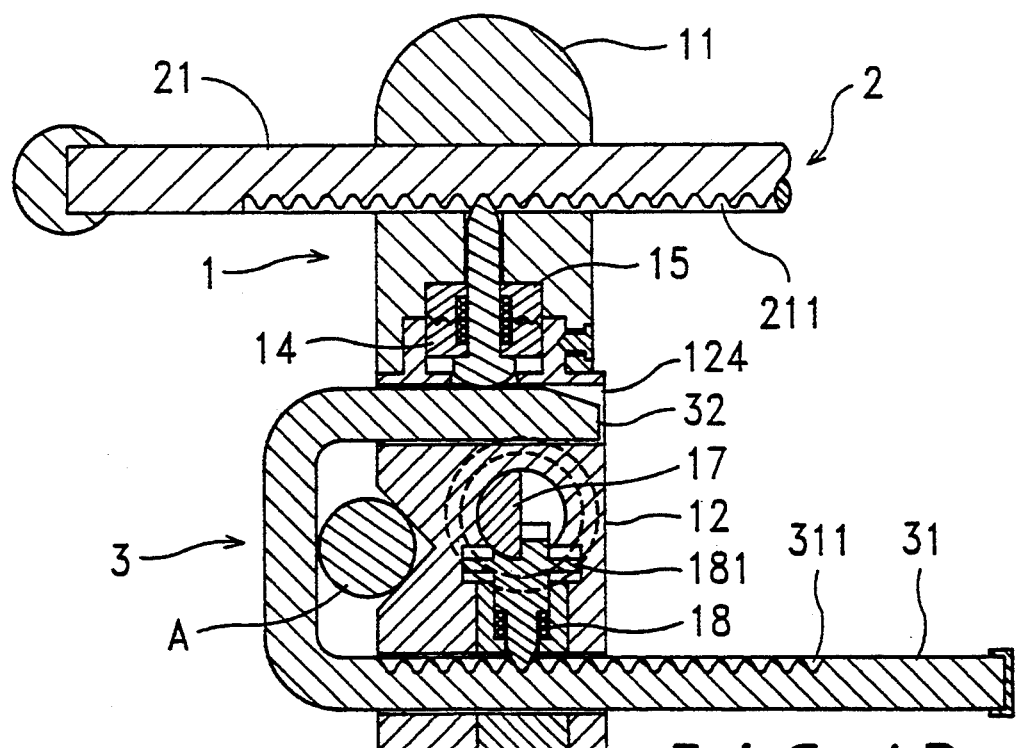
FIG. 4B still shows the working principle of the present invention.

When in use, first engage the gear shift lever A with the notch 122 of the locking portion 12 and insert the insert plate 222 into the tape cassette recorder of an automobile (not shown). Then, push the gear shift hook 3 toward the gear shift lever A so that the arm portion 32 is inserted into the inner hole 124 of the locking portion 12. In the meantime, the pin 13 is pushed upward to engage a thread 211 of the horizontal portion 21 of the telescopic rod 2 and the driving gear 14 is urged upward to engage the driven gear 15 (see FIGS. 4A and 5A). Hence, the telescopic rod 2 is kept at a fixed position. Thereafter, turn the key B to rotate the semi-circular member 17 downward thereby pushing the flange 181 and therefore, forcing the pin 18 downward to engage a thread 311 of the adjusting portion 31 of the gear shift hook 3 (see FIGS. 5A, 5B and 4B). Thus, the gear shift hook 3 is kept at a fixed position.

Figure 6A:
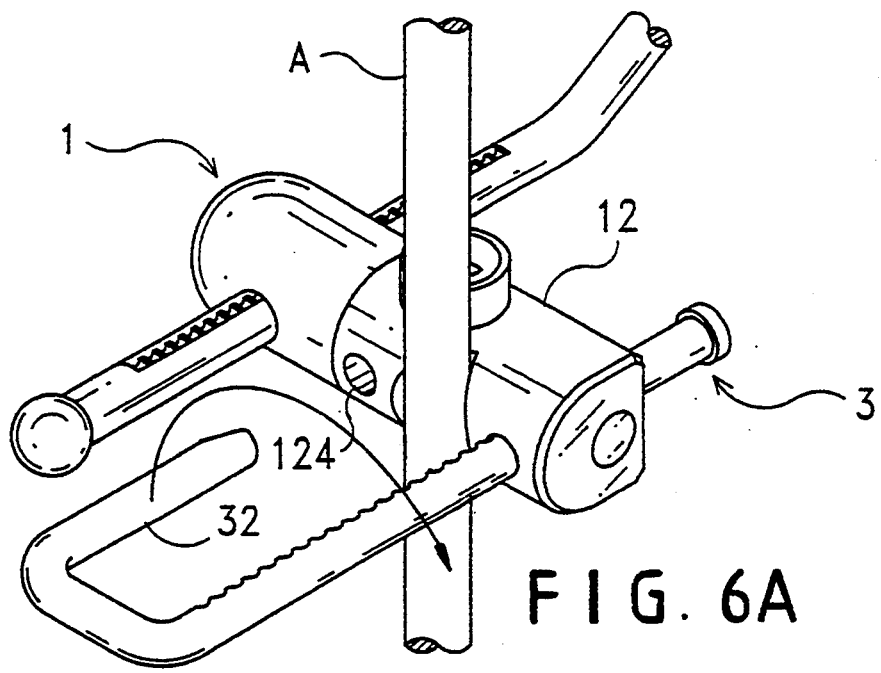
FIG. 6A still shows the working principle of the present invention.
Figure 6B:
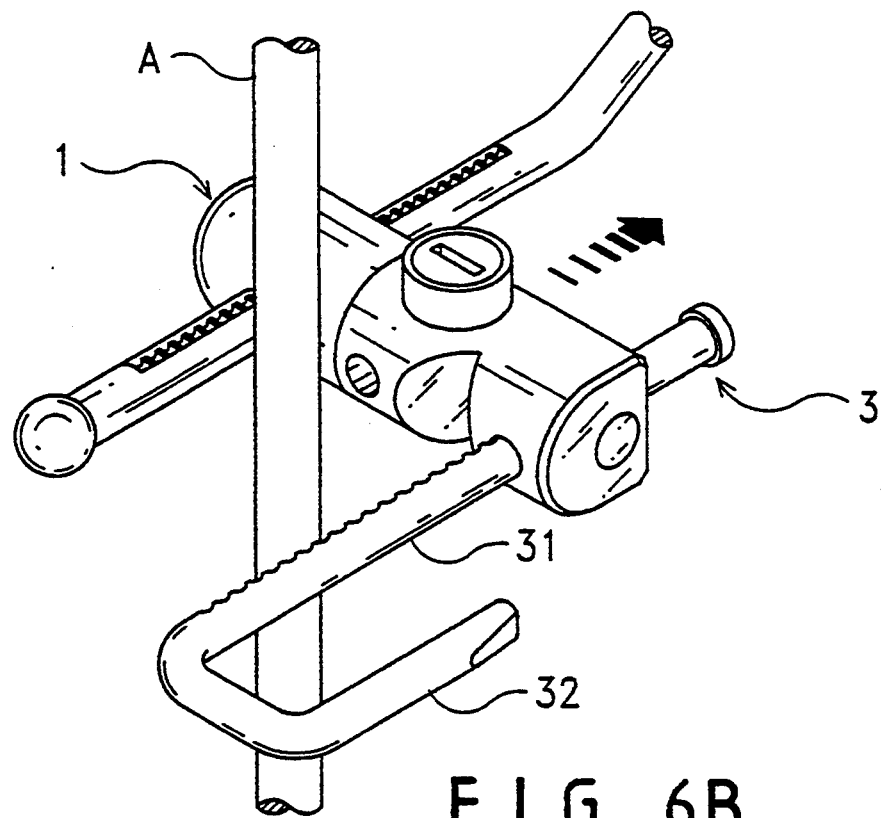
FIG. 6B still shows the working principle of the present invention.

When desired to open the present invention, simply turn the key B to disengage the pin 18 with the gear shift hook 3, pull the gear shift hook 3 outward so that the arm portion 32 goes out of the inner hole 124 of the locking portion 12, and rotate the gear shift hook 3 to the other side (see FIGS. 6A and 6B).

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:
1. An automobile lock comprising:
   a lock body including a locking portion and a swivel portion rotatably connected with said locking portion, said locking portion being provided with a lock core on a top surface, a first hole, a second hole and a notch between said first hole and said second hole;
   a first spring-loaded pin disposed within the locking portion of said lock body and controlled by said lock core;
   a second spring-loaded pin extending through said locking portion and said swivel portion and having a head protruding out of said second hole of said locking portion;
   a telescopic rod provided with threads, connected with a universal joint at one end, and connected with a ball member at another end, said universal joint being connected with an insert plate, said telescopic rod extending through said swivel portion; and
   a gear shift hook including an adjusting portion provided with threads and an arm portion, said adjusting portion being adapted to be inserted into the first hole of said lock body, said arm portion being adapted to be inserted into the second hole of said lock body.

* * * * *